United States Patent
Hyde et al.

(10) Patent No.: US 7,529,456 B2
(45) Date of Patent: *May 5, 2009

(54) PHOTONIC CRYSTAL SURFACE STATES

(75) Inventors: Roderick A. Hyde, Livermore, CA (US); Nathan P. Myhrvold, Medina, WA (US)

(73) Assignee: Searete LLC

( * ) Notice: Subject to any disclaimer, the term of this patent is extended or adjusted under 35 U.S.C. 154(b) by 0 days.

This patent is subject to a terminal disclaimer.

(21) Appl. No.: 11/514,757

(22) Filed: Sep. 1, 2006

(65) Prior Publication Data

US 2007/0217752 A1    Sep. 20, 2007

Related U.S. Application Data

(63) Continuation-in-part of application No. 11/384,022, filed on Mar. 17, 2006.

(51) Int. Cl.
*G02B 6/10* (2006.01)
(52) U.S. Cl. .............................. 385/129; 385/4; 385/5; 385/16; 385/23; 385/24; 385/25; 385/26; 385/27; 385/130; 385/131; 385/132
(58) Field of Classification Search ............ 385/16–23, 385/129–132, 27, 4–5; 359/428
See application file for complete search history.

(56) References Cited

U.S. PATENT DOCUMENTS

| | | | |
|---|---|---|---|
| 6,282,005 B1 * | 8/2001 | Thompson et al. .......... 398/143 |
| 6,473,541 B1 | 10/2002 | Ho | |
| 6,603,911 B2 | 8/2003 | Fink et al. | |
| 6,728,439 B2 | 4/2004 | Weisberg et al. | |
| 6,804,446 B1 | 10/2004 | Nordin et al. | |
| 6,879,386 B2 | 4/2005 | Shurgalin et al. | |
| 6,885,790 B2 * | 4/2005 | McCoy et al. ................. 385/16 |
| 6,914,999 B2 * | 7/2005 | Breukelaar et al. ............ 385/20 |
| 6,967,347 B2 * | 11/2005 | Estes et al. ..................... 257/25 |
| 7,005,669 B1 | 2/2006 | Lee | |
| 7,076,138 B2 * | 7/2006 | Rupasov et al. ............. 385/122 |
| 7,184,641 B2 | 2/2007 | Karalis et al. | |
| 7,269,313 B2 * | 9/2007 | Yanik et al. ................... 385/27 |
| 7,339,539 B2 | 3/2008 | Joannopoulos et al. | |
| 2005/0147339 A1 | 7/2005 | Prather et al. | |
| 2005/0157368 A1 * | 7/2005 | Vang et al. ................... 359/248 |
| 2007/0146866 A1 * | 6/2007 | Wright ....................... 359/332 |
| 2008/0240652 A1 * | 10/2008 | Todori et al. .................. 385/27 |

OTHER PUBLICATIONS

Moreno et al., "Enhanced transmission and beaming of light via photonic crystal surfcae modes".*
Moreno et al., "Efficient coupling of light into and out of a photonic crystal wavegudie via surface modes."*
Rahachou et al., "Waveguiding Properties of Surface States in Photonic Crystals".*
Moreno et al., "Enhanced transmission and beaming of light via photonic crystal surfcae modes".*
Moreno et al., "Efficient coupling of light into and out of a photonic crystal wavegudie via surface modes."*

(Continued)

*Primary Examiner*—Frank G Font
*Assistant Examiner*—Guy G Anderson

(57) ABSTRACT

A photonic crystal may be configured to support a surface state for logic.

32 Claims, 12 Drawing Sheets

OTHER PUBLICATIONS

Rahachou et al., "Waveguiding Properties of Surface States in Photonic Crystals".*
Rahachou et al., "Light Propagation in Finite and Infinite Photonic Crystals: the Recursive Green Function Technique," Physical Review B: Condensed Matter and Material Physics, Nov. 2005.*
Moreno et al., "Enhanced transmission and beaming of light via photonic crystal surfcae modes".*
Moreno et al., "Efficient coupling of light into and out of a photonic crystal wavegudie via surface modes."*
Rahachou et al., "Waveguiding Properties of Surface States in Photonic Crystals".*
U.S. Appl. No. 11/515,185, Hyde et al.
U.S. Appl. No. 11/515,165, Hyde et al.
Feng, Shuai; Sang, Hong-Yi; Li, Zhi-Yuan; Cheng, Bing-Ying; Zhang, Dao-Zhong; "Sensitivity of Surface States to the Stack Sequence of One-Dimensional Photonic Crystals"; Journal of Optics A; bearing dates of Mar. 2, 2005, Apr. 27, 2005, Jul. 12, 2005, and 2005; pp. 374-381; vol. 7; Institute of Physics Publishing.
Fink, Yoel; Winn, Joshua N.; Fan, Shanhui; Chen, Chiping; Michel, Jurgen; Joannopoulos, John D.; and Thomas, Edwin L.; "A Dielectric Omnidirectional Reflector"; Science; bearing dates of Aug. 6, 1998, Oct. 6, 1998 and Nov. 27, 1998; pp. 1679-1682; vol. 282.
Moreno, Esteban; Garcia-Vidal, F.J.; and Martin-Moreno, L.; "Enhanced Transmission and Beaming of Light Via Photonic Crystal Surface Modes"; Physical Review B; bearing dates of Oct. 27, 2003, Dec. 29, 2003, Mar. 9, 2004, and 2004; pp. 121402-1-121402-4; vol. 69; The American Physical Society.
Moreno, Esteban; Martin-Moreno, L.; and Garcia-Vidal, F.J.; "Efficient Coupling of Light Into and Out of a Photonic Crystal Waveguide Via Surface Modes"; Photonics and Nanostructures—Fundamentals and Applications; bearing dates of Jun. 14, 2004, Jul. 19, 2004, Jul. 22, 2004, Aug. 20, 2004, and 2004; pp. 97-102; vol. 2; Elsevier B.V.
Pile, David F.P.; "Gap Modes of One-Dimensional Photonic Crystal Surface Waves"; Applied Optics; Jul. 10, 2005; pp. 4398-4401; vol. 44; Issue 20; Optical Society of America.
Rahachou, A.I. and Zozoulenko, I.V.; "Surface State Photonic Bandgap Cavities"; Linkoping University, Dept. of Science and Technology; bearing dates of Jul. 1, 2005 and Dec. 12, 2005 and printed on Feb. 28, 2006; pp. 1-3; located at http://www.arxiv.org/abs/physics/0507009.
Rahachou, A.I. and Zozoulenko, I.V.; "Waveguiding Properties of Surface States in Photonic Crystals"; Linkoping University, Dept. of Science and Technology; bearing a date of Oct. 31, 2005 and printed on Feb. 28, 2006; pp. 1-4; located at http://www.itn.liu.se/meso-phot/publications/2005_waveguides_0510273.pdf.
Salerno, M.; Krenn, J.R.; Lamprecht, B.; Schider, G.; Ditlbacher, H.; Felidj, N.; Leitner, A.; Aussenegg, F.R.; "Plasmon Polaritons in Metal Nanostructures: The Optoelectronic Route to Nanotechnology"; Opto-Electronics Review; bearing a date of 2002 and printed on Feb. 28, 2006; pp. 217-222; vol. 10; No. 3.
Yablonovitch, Eli; "Photonic Crystals: Semiconductors of Light"; Scientific American; Dec. 2001; printed on Feb. 28, 2006; pp. 47-55; vol. 285, No. 6; Scientific American, Inc.; located at http://www.ee.ucla.edu/~photon/eliy_SCIAM.pdf.
Yan, M.; "Introduction to Microstructured Optical Fibers"; Cornell University Library; Aug. 31, 2005; pp. 1-19;located at http://arxiv.org/PS_cache/physics/pdf/0508/0508139.pdf.
Darabi, Elham; Khorasani, Sina; Rashidian, Bizhan; "Optical Modulation by Surface States;" Semiconductor Science and Technology; Jan. 2003; pp. 60-67; vol. 18; No. 1; printed on Nov. 18, 2007 and located at http://www.iop.org/EJ/article/0268-1242/18/1/309/s30109.html; [14 pages total from this website are submitted herewith] Institute of Physics and IOP Publishing Limited.

* cited by examiner

PHOTONIC CRYSTAL SURFACE STATES

RELATED APPLICATIONS

For purposes of the USPTO extra-statutory requirements, the present application constitutes a continuation-in-part of U.S. patent application Ser. No. 11/384,022, entitled PHOTONIC CRYSTAL SURFACE STATES, naming RODERICK A. HYDE and NATHAN P. MYHRVOLD as inventors, filed Mar. 17, 2006, which is currently co-pending, or is an application of which a currently co-pending application is entitled to the benefit of the filing date.

The United States Patent Office (USPTO) has published a notice to the effect that the USPTO's computer programs require that patent Applicant reference both a serial number and indicate whether an application is a continuing or continuing-in-part. Stephen G. Kunin, *Benefit of Prior-Filed Application*, USPTO Official Gazette Mar. 18, 2003, available at http://www.uspto.gov/web/offices/com/sol/og/2003/week 11/patbene.htm. The present applicant entity has provided above a specific reference to the application(s) from which priority is being claimed as recited by statute. Applicant entity understands that the statute is unambiguous in its specific reference language and does not require either a serial number or any characterization, such as "continuing" or "continuing-in-part," for claiming priority to U.S. patent applications. Notwithstanding the foregoing, applicant entity understands that the USPTO's computer programs have certain data entry requirements, and hence applicant entity is designating the present application as a continuing-in-part of its parent applications as set forth above, but expressly points out that such designations are not to be construed in any way as any type of commentary and/or admission as to whether or not the present application contains any new matter in addition to the matter of its parent application(s).

All subject matter of the Related Application and of any and all parent, grandparent, great-grandparent, etc. applications of the Related Applications is incorporated herein by reference to the extent such subject matter is not inconsistent herewith.

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith. The United States Patent Office (USPTO) has published a notice to the effect that the USPTO's computer programs require that patent applicants reference both a serial number and indicate whether an application is a continuation or continuation in part. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

TECHNICAL FIELD

The present application relates, in general, to photonic crystal surface states.

SUMMARY

In one embodiment, an apparatus comprises a first photonic crystal structure including a boundary region configured to support a surface state, the first photonic crystal structure including a first surface state input coupled to the boundary region, a first surface state output coupled to the boundary region, and a first gate, the first gate including a region having one or more variable electromagnetic properties.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
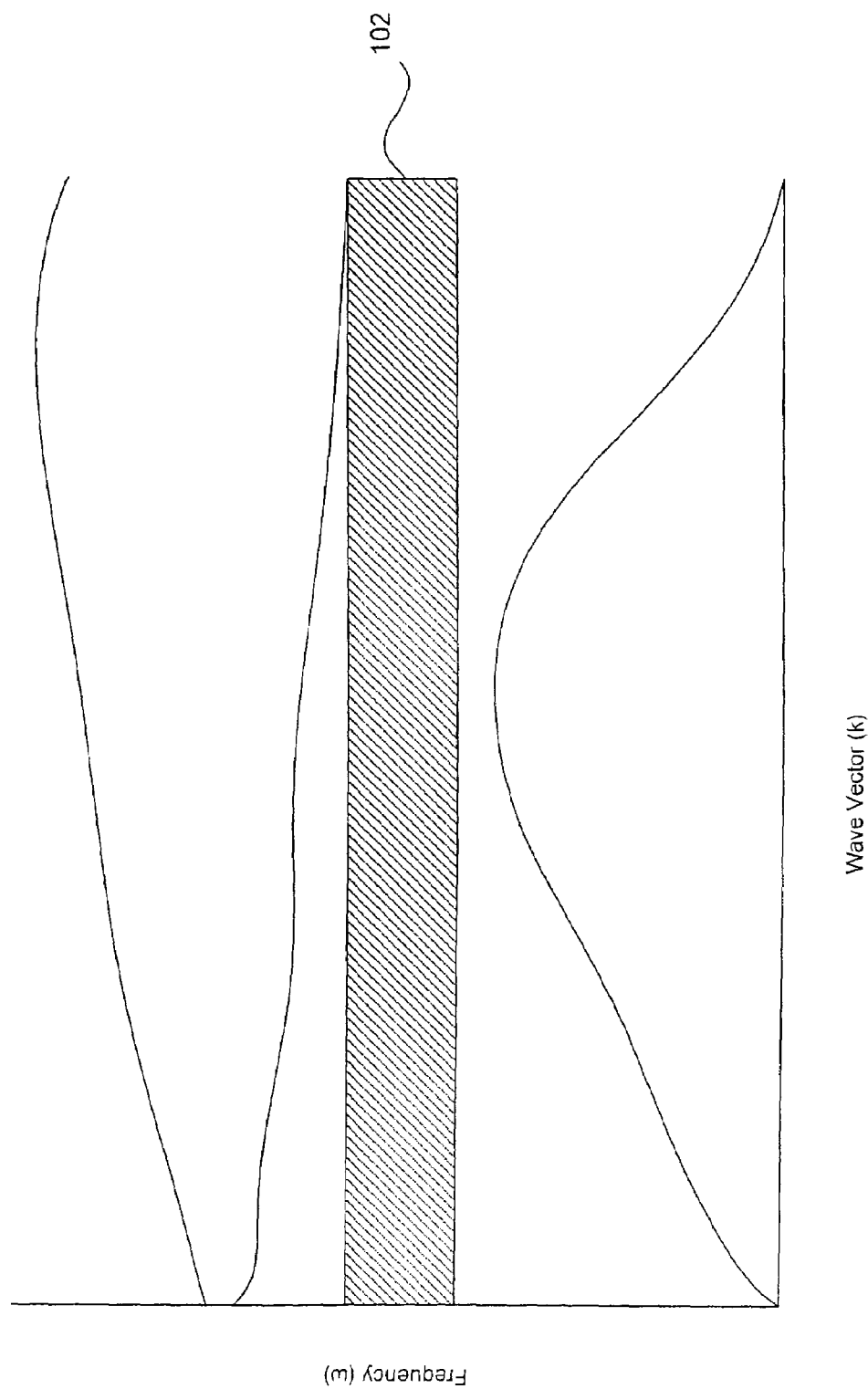
FIG. 1 shows a photonic band gap diagram.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

A surface state may exist on a dielectric-dielectric interface where one of the dielectrics has a negative, or effectively negative, permittivity. For example, where one or both of the dielectrics is a material having a band gap, such as a photonic crystal, a surface state may exist at the interface between the photonic crystal and the other dielectric in the forbidden energy bands of the photonic crystal. Photonic crystals are described in E. Yablonovitch, "PHOTONIC CRYSTALS: SEMICONDUCTORS OF LIGHT", Scientific American, December 2001, Volume 285, Number 6, pages 47-55, which is incorporated herein by reference. A band gap diagram with band gap 102 is shown in FIG. 1. The photonic crystal may be a 1D, 2D, or 3D photonic crystal as described in Yablonovitch. A photonic crystal may guide surface states as described in A. I. Rahachou and I. V. Zozoulenko, "WAVEGUIDING PROPERTIES OF SURFACE STATES IN PHOTONIC CRYSTALS", Linkoping University, Department of Science and Technology, bearing a date of Oct. 31, 2005, pages 1-4 and located at http://www.itn.liu.se/meso-phot/publications/2005 waveguides 0510273.pdf, which is incorporated herein by reference and a copy of which is attached hereto as Appendix A.

Figure 2:
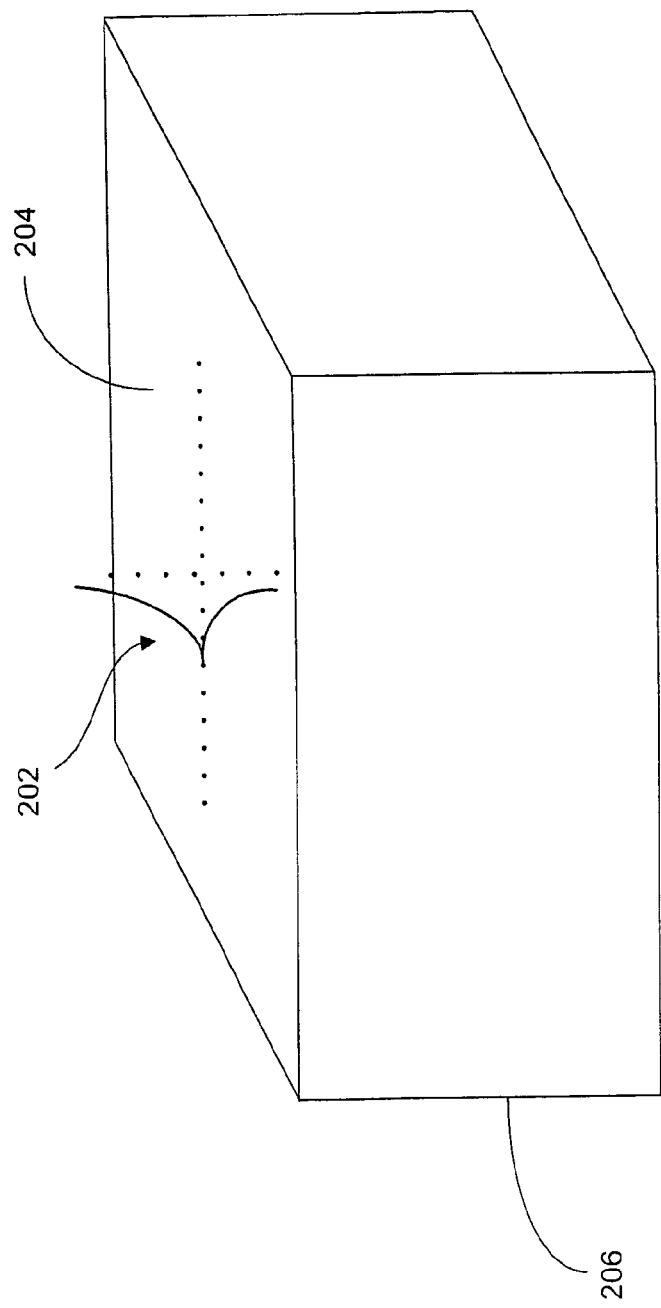
FIG. 2 shows a first photonic crystal structure.

FIG. 2 shows a surface state 202 at a boundary region 204 of a first photonic crystal structure 206. The material or structure (not shown) forming the boundary region 204 with the photonic crystal structure 206 may be: air, vacuum, or its equivalent; a substantially homogeneous dielectric material; a second photonic crystal structure; or a different material or structure. The boundary region 204, although shown as being substantially continuous and planar, may have a different shape. The surface state 202, although shown as including substantially exponential functions with a field maximum at the boundary region 204, may include only approximately exponential functions, may be described by a different function, and/or may have a field maximum someplace other than the boundary region 204. Further, although the surface state 202 is shown at a certain location on the first photonic crystal structure 206 for illustrative purposes, the spatial distribution of the surface state 202 may be anything.

Figure 3:
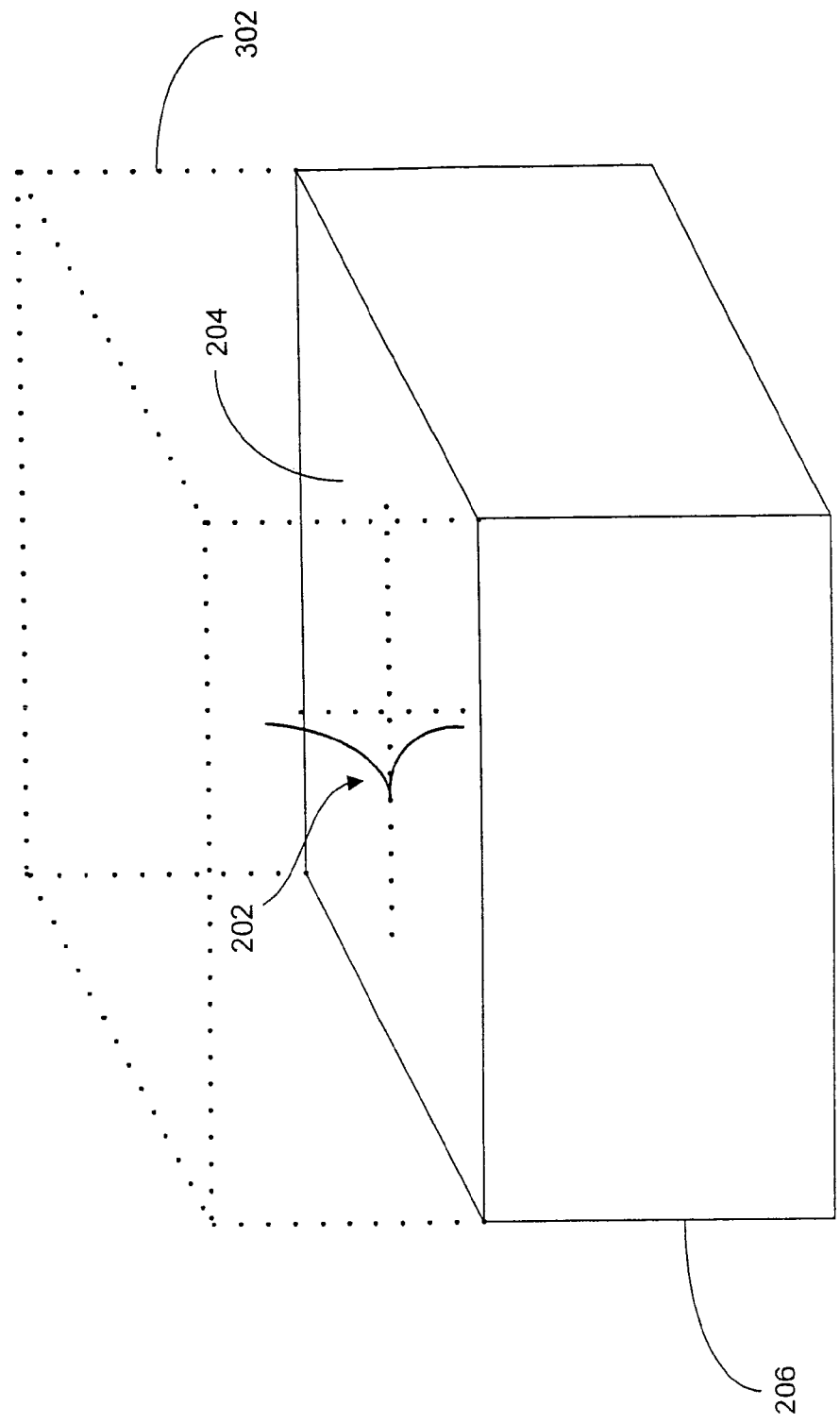
FIG. 3 shows a first photonic crystal structure and a second structure.

FIG. 3 shows a surface state 202 at the interface between a first photonic crystal structure 206 and a second structure 302. The second structure 302 may include a second photonic crystal, a substantially homogeneous dielectric material, or a different structure. In the case where the second structure 302 includes a second photonic crystal, the second photonic crystal may have a band gap that overlaps with the band gap of the first photonic crystal structure 206. Further, although FIG. 3 shows the second structure 302 as being in substantially intimate contact with the boundary region 204 of the first photonic crystal structure 206, the first photonic crystal structure 206 and the second structure 302 may be separated by some amount, as is described in David F. P. Pile, "GAP MODES OF ONE-DIMENSIONAL PHOTONIC CRYSTAL SURFACE WAVES", Applied Optics, Jul. 10, 2005, Volume 44, Issue 20, pages 4398-4401.

Figure 4:
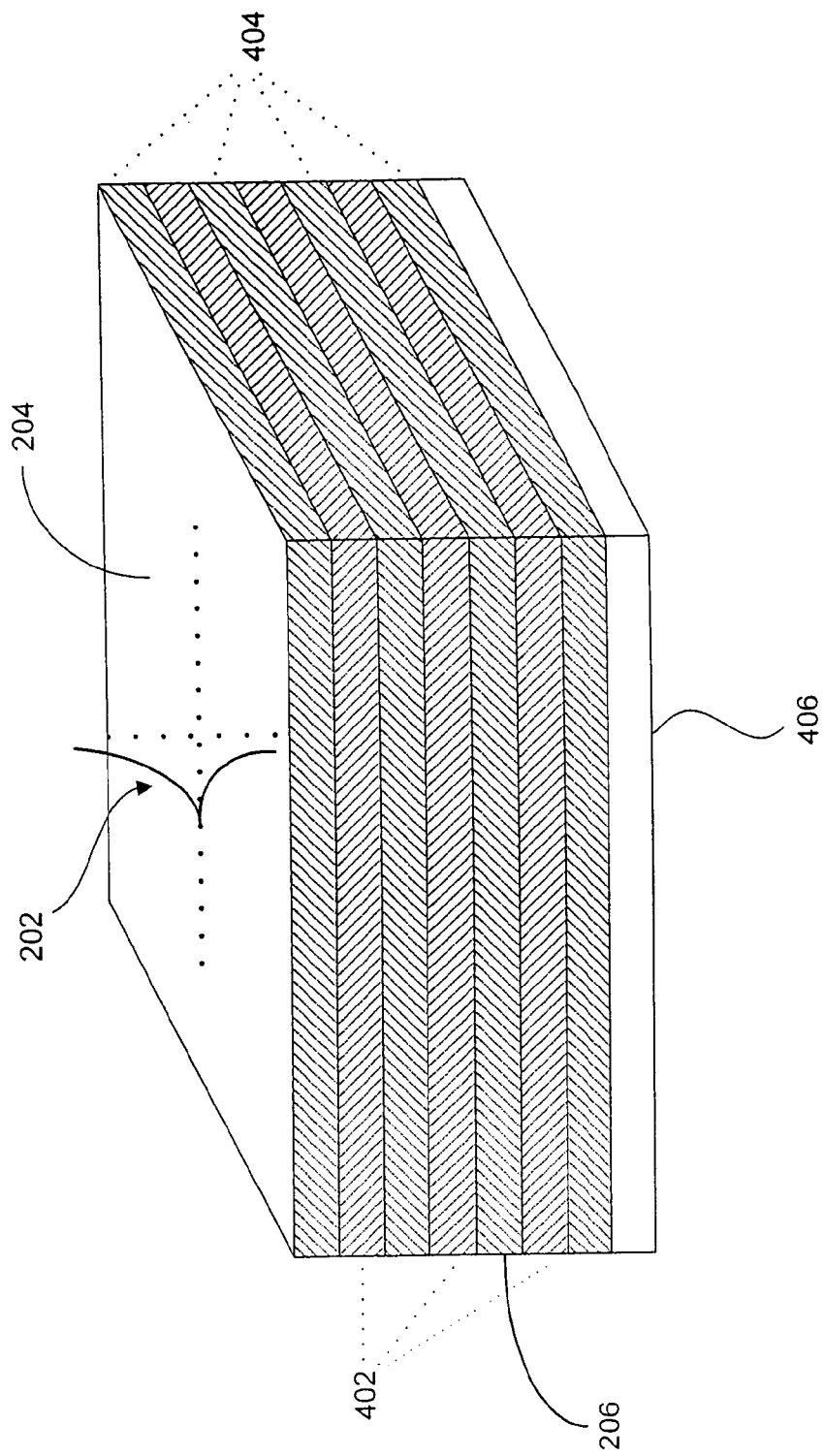
FIG. 4 shows a first photonic crystal structure including a first material and a second material.

FIG. 4 shows a surface state 202 at the boundary region 204 of the first photonic crystal structure 206, where the first photonic crystal structure 206 includes a 1D photonic crystal comprising layers of a first material 402 and a second material 404 fabricated on a substrate 406. Examples of 1D photonic crystals are given in Yablonovitch and in Y. Fink, J. N. Winn, S. Fan, C. Chen, J. Michel, J. D. Joannopoulos, and E. L. Thomas, "A DIELECTRIC OMNIDIRECTIONAL REFLECTOR", Science, Nov. 27, 1998, Volume 282, pages 1679-1682, which is incorporated herein by reference.

Although the first photonic crystal structure 206 is shown having alternating layers of a first material 402 and a second material 404, where the layers have substantially equal thicknesses, the layer thicknesses and materials 402, 404 may be chosen according to the design of the first photonic crystal structure 206, and the layer thicknesses may vary. For example, the design of the first photonic crystal structure 206 may be such that the layer thicknesses are configured to vary, the layer thicknesses may vary slightly due to fabrication imperfections, the structure may include a top layer having a thickness inconsistent with the periodicity of the remainder of the first photonic crystal structure 206, and/or there may be other reasons for variations in the layer thicknesses. Although the first photonic crystal structure 206 is shown having two different materials 402, 404, it may have more than two types of materials. Further, although the first photonic crystal structure 206 is shown having seven layers in FIG. 4, it may have a different number of layers. The first photonic crystal structure 206 in FIG. 4 is shown as a 1D photonic crystal for exemplary purposes, but in other embodiments the first photonic crystal structure 206 may be a 2D or 3D photonic crystal structure, and may have variations analogous to those described for a 1D photonic crystal structure.

Figure 5:
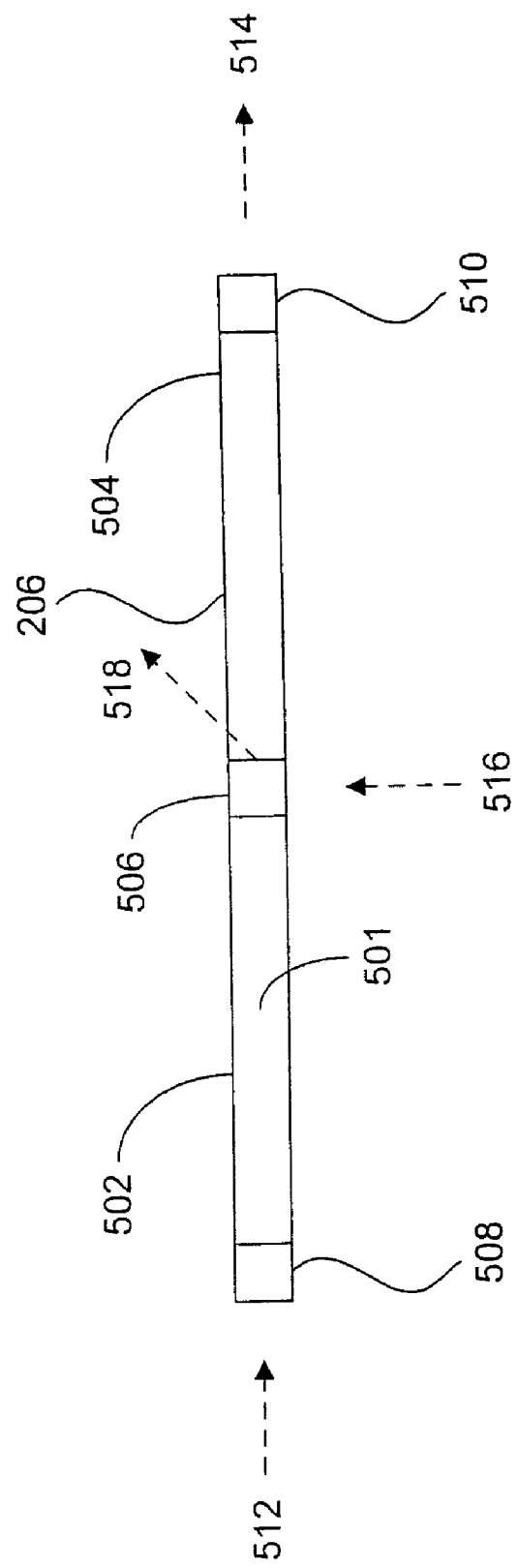
FIG. 5 shows a top view of a first photonic crystal structure.
Figure 6:
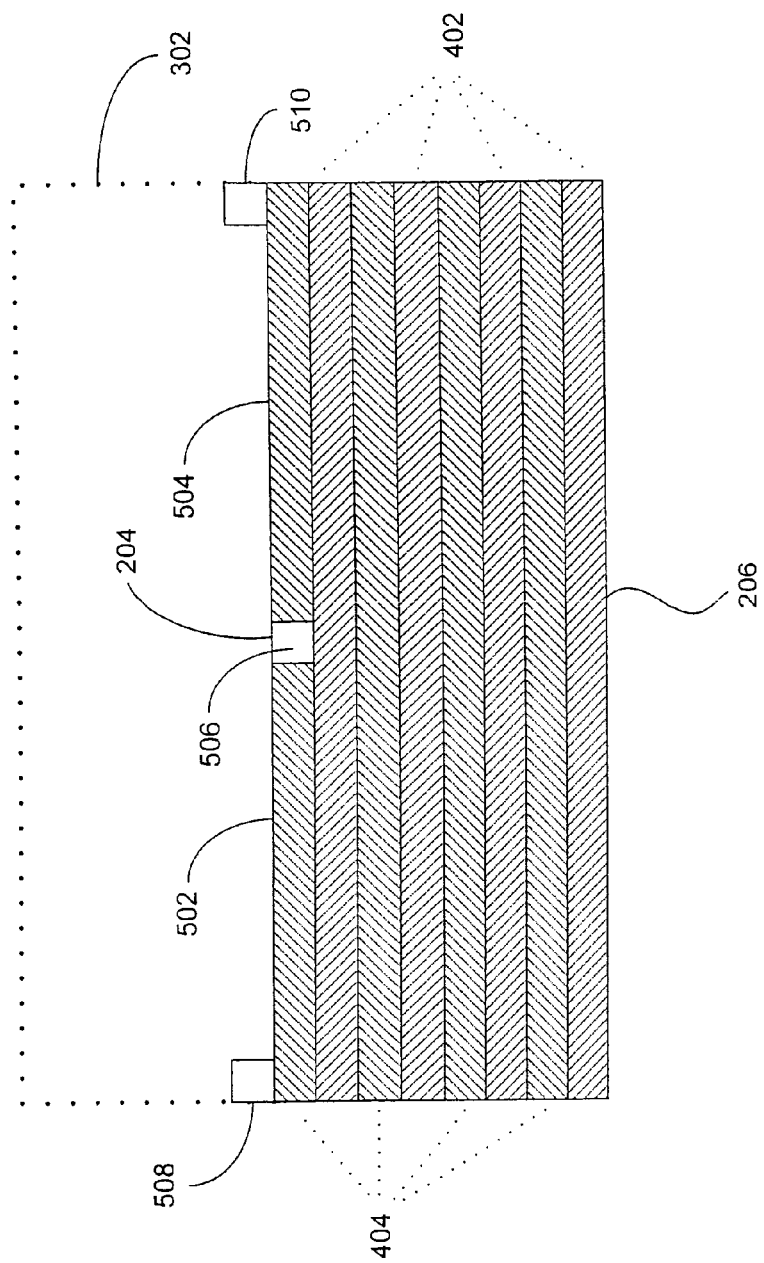
FIG. 6 shows a side view of a first photonic crystal structure.

FIG. 5 shows a top cross-sectional view and FIG. 6 shows a side cross-sectional view of a first embodiment of the first photonic crystal structure 206 configured as a first guide 501 with a first surface state input 502, a first surface state output 504, and a first gate 506, where the first photonic crystal structure 206 is a 1D photonic crystal configured with alternating layers of a first material 402 and a second material 404 as shown in FIG. 4. An input coupling structure 508 is configured to convert incoming light 512 into a surface state 202 (shown in FIGS. 2-4), and an output coupling structure 510 is configured to convert a surface state 202 into outgoing light 514.

One type of input and/or output coupling structure 508, 510 is described in E. Moreno, L. Martin-Moreno, and F. J. Garcia-Vidal, "EFFICIENT COUPLING OF LIGHT INTO AND OUT OF A PHOTONIC CRYSTAL WAVEGUIDE VIA SURFACE MODES", Photonics and Nanostructures—Fundamentals and Applications, October, 2004, Volume 2, Issue 2, pages 97-102; and in E. Moreno, F. J. Garcia-Vidal, and L. Martin-Moreno, "ENHANCED TRANSMISSION AND BEAMING OF LIGHT VIA PHOTONIC CRYSTAL SURFACE MODES", Physical Review B, Mar. 9, 2004, Volume 69, pages 121402-1-121402-4, each of which is incorporated herein by reference.

In the embodiments shown in FIGS. 5 and 6, the first gate 506 includes a photorefractive material configured with a rest dielectric constant when light 516 is not incident on it and an excited dielectric constant when light 516 is incident on it. The rest dielectric constant is substantially equal to that of the second material 404, such that the surface state 202 may propagate along the boundary region 204 of the first gate 506. When light 516 is incident on the first gate 506, the dielectric constant of the photorefractive material changes to the excited dielectric constant, where the excited dielectric constant is different from that of the second dielectric material such that a surface state 202 may not propagate along the boundary region 204 through the first gate 506.

In another embodiment, the responsiveness of the first gate 506 to light 516 is inverted. In this embodiment, the rest dielectric constant is sufficiently different from that of the second dielectric material such that a surface state 202 does not propagate along the boundary region 204 through the first gate 506. When light 516 is incident on the first gate 506, the dielectric constant of the photorefractive material changes to the excited dielectric constant, where the excited dielectric constant is substantially equal to that of the second material 404, such that the surface state 202 may propagate along the boundary region 204 of the first gate 506. One skilled in the art will recognize that this inverted functionality can be generally incorporated in gates such as the first gate 506.

Although the first gate 506 is described in the embodiment above as including a photorefractive material, in some embodiments the first gate 506 may include a region having one or more other variable electromagnetic properties, for example, a magnetically responsive material, an electrically responsive material, a thermally responsive material, an acoustically responsive material, a mobile material, or a different material or structure that may change dimension, refractive index, or another property in response to energy, a field, or a different stimulus.

Although the first gate 506 is shown as a small, rectilinear portion of the top layer of a 1D photonic crystal, there are many other gate configurations. For example, an entire layer of a 1D photonic crystal may have variable electromagnetic properties, all of the layers of a 1D photonic crystal may have variable electromagnetic properties, or there may be a different configuration of a 1D photonic crystal having variable electromagnetic properties that may form the first gate 506. Although FIG. 6 shows the first photonic crystal structure 206 including a 1D photonic crystal structure, in other embodiments the photonic crystal structure 206 may include a different kind of photonic crystal, for example, a 2D or 3D photonic crystal, or it may include multiple types of photonic crystals.

Although the first surface state output 504 is shown as being colinear with the first surface state input 502, in some embodiments the first surface state output 504 may not be colinear with the first surface state input 502, as indicated by the arrow 518.

Figure 7:
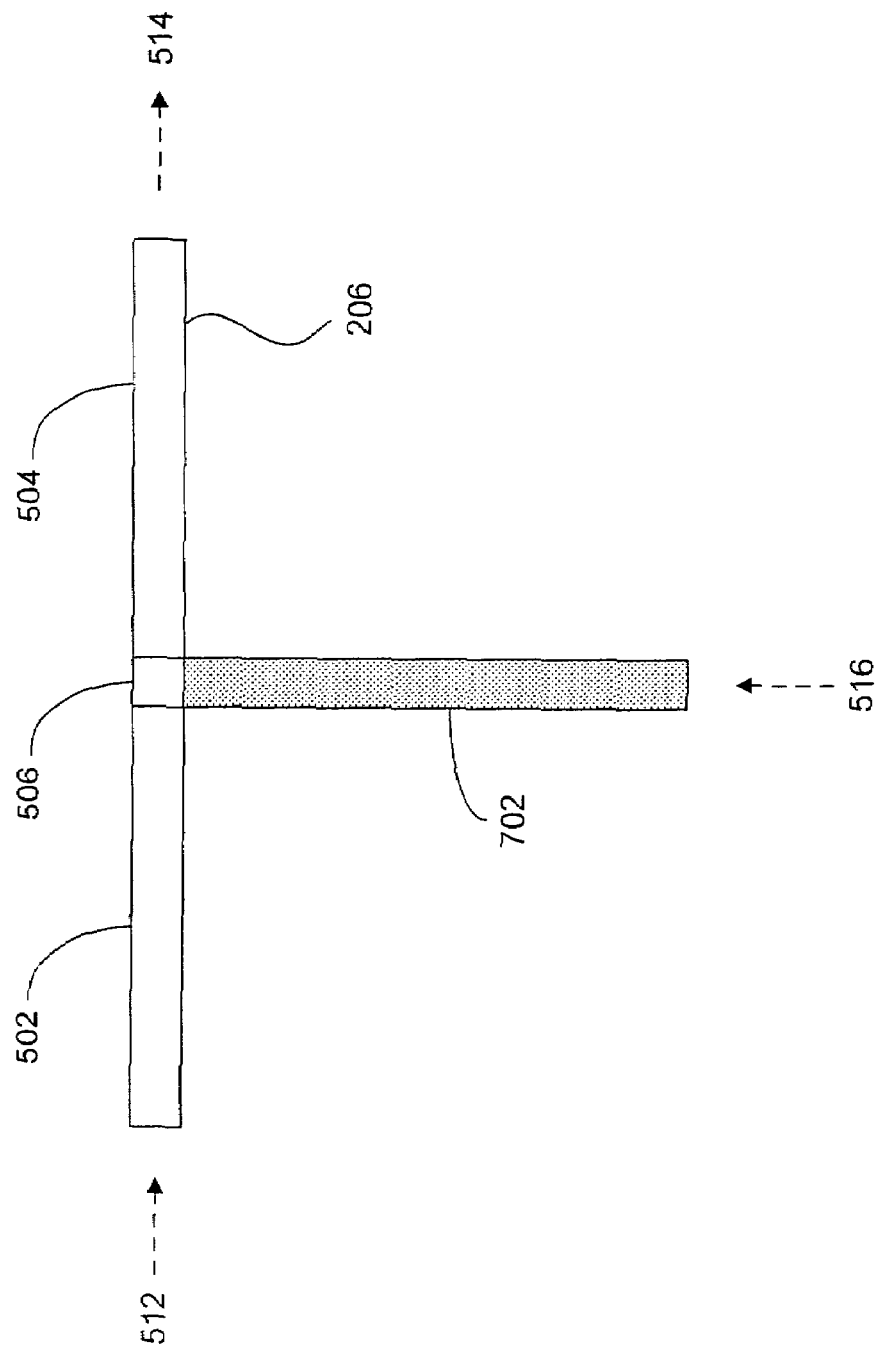
FIG. 7 shows a top view of a first photonic crystal structure and an energy guide.

FIG. 7 shows the embodiment of FIG. 5 further including an energy guide 702 coupled to the first gate 506 to direct energy to it. In the embodiment shown in FIG. 7, the energy guide 702 is an optical fiber configured to direct energy substantially in the optical frequency range to the first gate 506. In other embodiments, the type of energy guide 702 may be determined by the type of variable electromagnetic properties of the first gate 506. For example, where the first gate 506 is configured with an acoustically responsive material, the energy guide 702 may be configured to direct acoustic energy to the first gate 506. Or, where the first gate 506 is configured with a photorefractive material, the energy guide 702 may be configured to direct electromagnetic energy, where the type of energy guide 702 may be dependent on the frequency of the electromagnetic energy or on other factors. In one embodiment, where the first gate 506 is configured with a photorefractive material, the energy guide 702 may be configured to carry electromagnetic energy in the form of a surface state 202 (shown in FIGS. 2-4) to the first gate 506.

Figure 8:
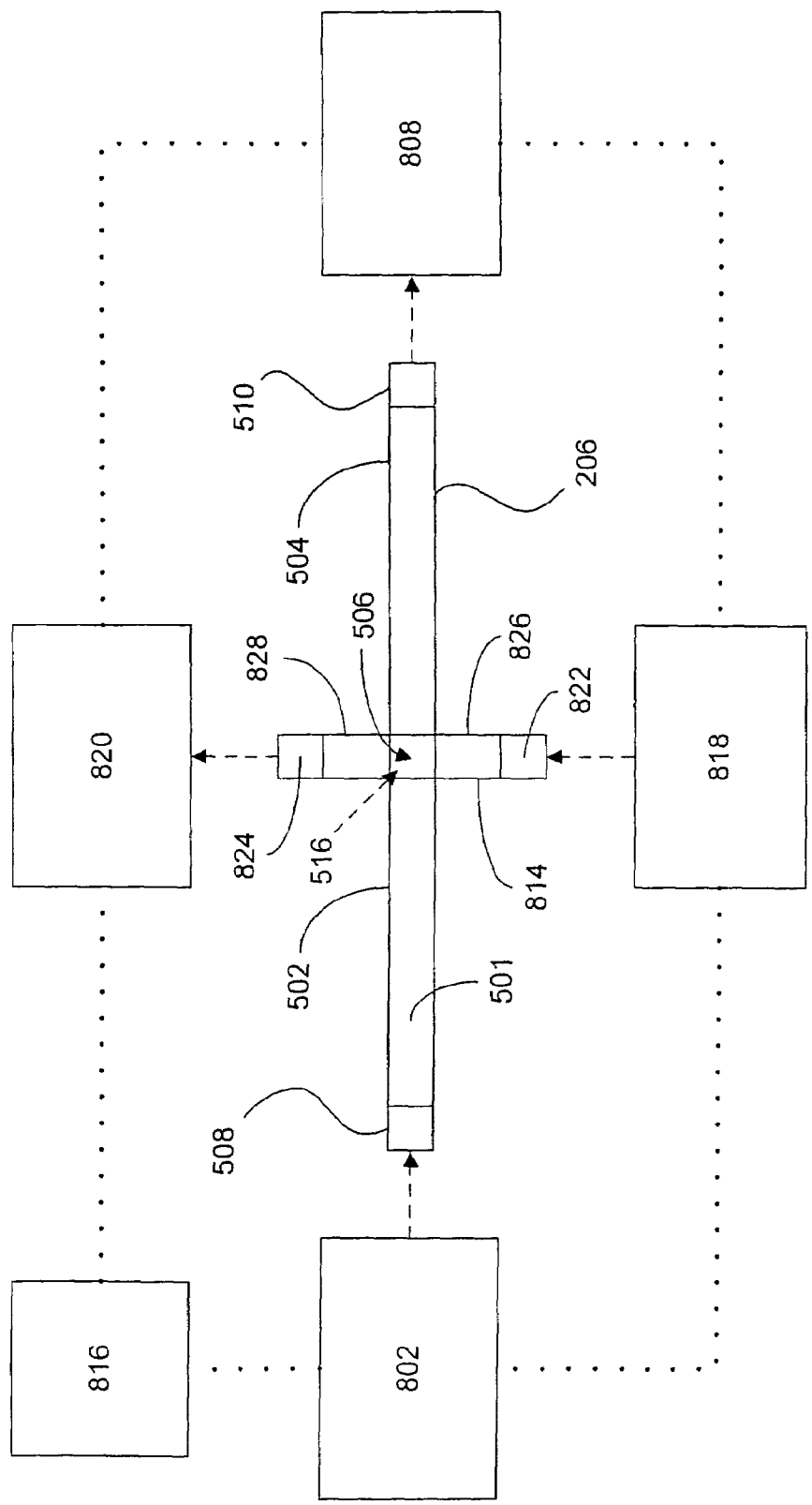
FIG. 8 shows a top view of a system including a first photonic crystal structure.

FIG. 8 shows an embodiment including a second guide 814 structured to support a surface state 202 (shown in FIGS. 2-4), where the first guide 501 and the second guide 814 form an intersection region that includes the first gate 506. The first guide 501 and the second guide 814 are both structured as shown in FIGS. 5 and 6 and are configured to intersect at the position of the first gate 506. Light 516 incident on the gate can thus prohibit the propagation of a surface state from the first surface state input 502 to the first surface state output 504, and from the gate surface state input 826 to the gate surface state output 828.

FIG. 8 further includes an energy generator 802 configured to produce energy. The input coupling structure 508 is configured to couple the energy from the energy generator 802 to a surface state 202. In one embodiment, the energy generator 802 may be a device configured to produce electromagnetic energy, such as a laser, and the input coupling structure 508 may include a converter configured to convert energy to a surface state 202. Although the energy generator 802 is shown separate from the first photonic crystal structure 206, in some embodiments the first photonic crystal structure 206 may include the energy generator.

FIG. 8 further includes the output coupling structure 510, where the output coupling structure 510 may include a converter configured to convert a surface state 202 into a different form of energy such as electromagnetic energy, and/or a region arranged to output the energy. FIG. 8 further includes a detector 808, where the detector 808 may include a device configured to detect electromagnetic energy, such as a photodetector or other detector, or the detector 808 may be configured to detect a different kind of energy, depending on the type of energy output from the output coupling structure 510. Although FIG. 8 includes an input coupling structure 508 and an output coupling structure 510, in some embodiments these may not be included, for example, where the energy generator 802 is within the photonic crystal structure 206, the input coupling structure 508 may not be included.

FIG. 8 further includes a gate energy generator 818, a second input coupling structure 822, a second output coupling structure 824, and a gate energy detector 820. The second input coupling structure 822 is configured to couple the energy from the gate energy generator 818 to a surface state 202. In one embodiment, the gate energy generator 818 may be a device configured to produce electromagnetic energy, such as a laser, and the second input coupling structure 822 may include a converter configured to convert energy to a surface state 202. Although the gate energy generator 818 is shown separate from the second guide 814, in some embodiments the second guide 814 may include the energy generator.

The second output coupling structure 824 may include a converter configured to convert a surface state 202 into a different form of energy such as electromagnetic energy, and/or a region arranged to output the energy. The gate energy detector 820 is configured to receive energy from the second output coupling structure 824 and may include a device configured to detect electromagnetic energy, such as a photodetector or other detector, or the gate energy detector 820 may be configured to detect a different kind of energy, depending on the type of energy output from the second output coupling structure 824. Although FIG. 8 includes a second input coupling structure 822 and a second output coupling structure 824, in some embodiments these may not be included, for example, where the gate energy generator 818 is within the second guide 814, the second input coupling structure 822 may not be included.

FIG. 8 further includes a processor 816 operably connected to the energy generator 802, the detector 808, the gate energy generator 818, and the gate energy detector 820. The processor 816 may be connected directly to the elements 802, 808, 818, 820, and/or there may be intermediate devices. Further, there may be more than one processor 816. Although the processor 816 is shown only in FIG. 8, any of the embodiments may include a processor, where the processor 816 may be operably connected to any of the elements of the system.

Figure 9:
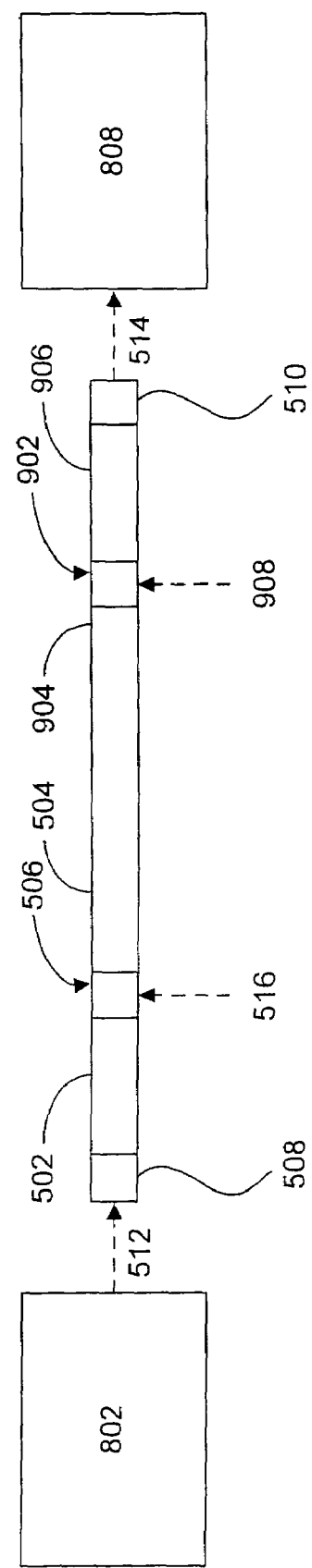
FIG. 9 shows a top view of a system including a first photonic crystal structure.

FIG. 9 shows a top cross-sectional view of an embodiment similar to that of FIGS. 5 and 6, further including a second gate 902, a second surface state input 904, and a second surface state output 906. The input coupling structure 508 is configured to convert incoming light 512 into a surface state 202 (shown in FIGS. 2-4), and the output coupling structure 510 is configured to convert a surface state 202 into outgoing light 514. In this embodiment, the gates 506, 902 both include a photorefractive material configured with a rest dielectric constant when light 516 or 908 is not incident on it and an excited dielectric constant when light 516 or 908 is incident on it. The rest dielectric constant is substantially equal to that of the second dielectric material 404, such that the surface state 202 may propagate along the boundary region 204 of the gates 506, 902. When light 516 or 908 is incident on one of the gates 506 or 902, the dielectric constant of the photorefractive material changes to the excited dielectric constant, where the excited dielectric constant is different from that of the second dielectric material such that a surface state 202 may not propagate through the gate 506 or 902. Thus light 516 or 908 incident on either gate 506 or 902 can inhibit light 514 from being detected by the detector 808.

In the embodiment shown in FIG. 9, the first surface state output 504 is coupled to the second surface state input 904. However, there are other configurations. For example, referring to the embodiment in FIG. 8, the gate surface state output 828 may be coupled to a second surface state input 904, or both the gate surface state output 828 and first surface state output 504 may correspond to inputs to other gates. Further, although the embodiment shown in FIG. 9 includes two gates 506 and 902, the system may be configured with any number of gates. There are many ways that gates may be assembled to form different types of logic and one skilled in the art may find other ways of combining the gates to form logic.

As described with reference to FIGS. 5 and 6, although the gates 506, 902 are described in the embodiment in FIG. 9 as including a photorefractive material, in some embodiments one or both gates 506, 902 may include a region having one or more other variable electromagnetic properties, for example, a magnetically responsive material, an electrically responsive material, a thermally responsive material, an acoustically responsive material, or a different material or structure that may change dimension, refractive index, or another property in response to energy, a field, or a different stimulus.

Further, although the gates 506, 902 are shown as small, rectilinear portions of the top layer of a 1D photonic crystal, there are many other gate configurations. For example, an entire layer of a 1D photonic crystal may have variable electromagnetic properties, all of the layers of a 1D photonic crystal may have variable electromagnetic properties, or there may be a different configuration of a photonic crystal having variable electromagnetic properties that may form gates 506, 902.

Figure 10:
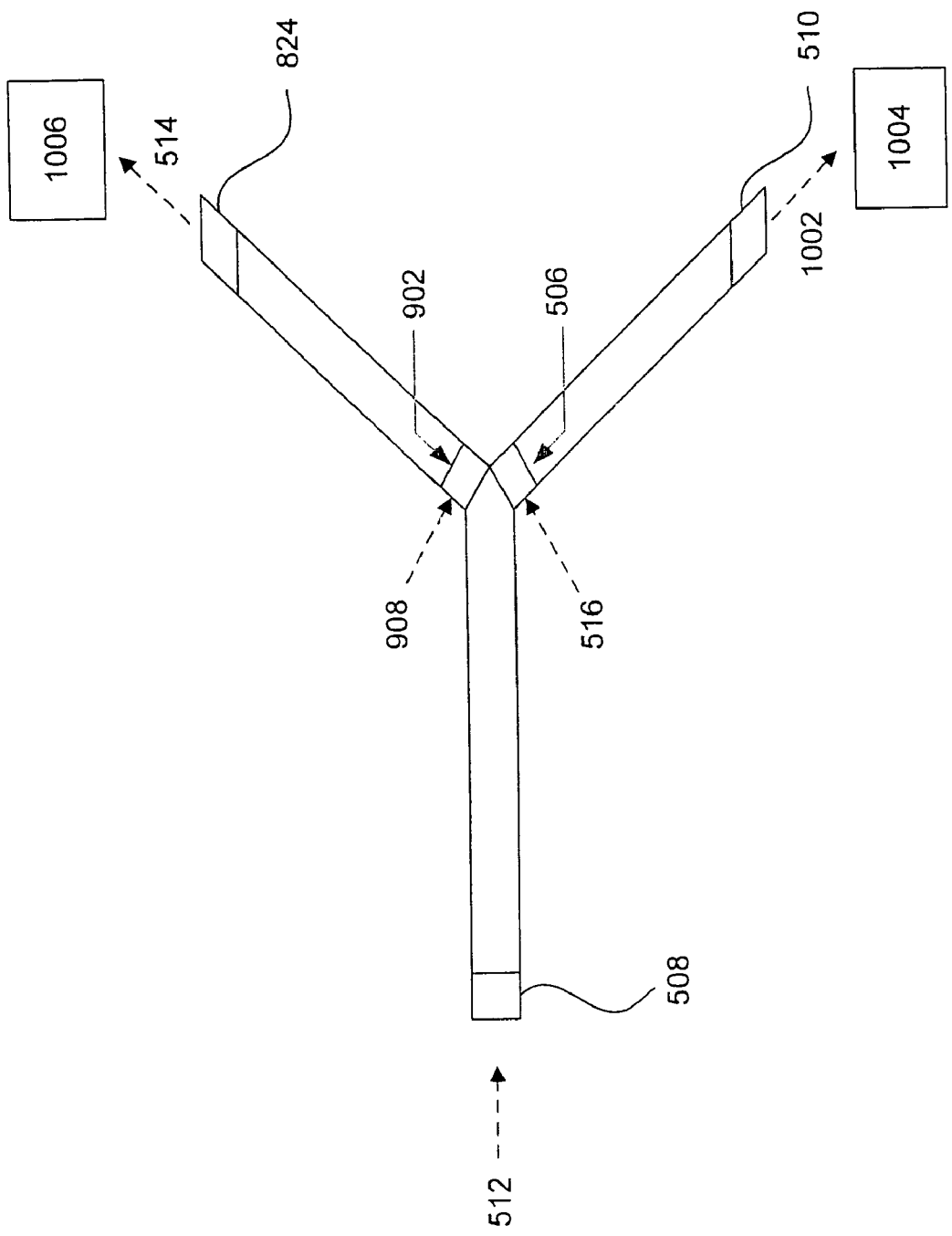
FIG. 10 shows a top view of a system including a first photonic crystal structure.

FIG. 10 shows a top cross-sectional view of another embodiment similar to that in FIGS. 5 and 6, but having two gates 506 and 902. The input coupling structure 508 is configured to convert incoming light 512 into a surface state 202 (shown in FIGS. 2-4), and the output coupling structures 510, 824 are each configured to convert a surface state 202 into outgoing light 514, 1002. In this embodiment, the gates 506, 902 both include a photorefractive material configured with a rest dielectric constant when light 516 or 908 is not incident on it and an excited dielectric constant when light 516 or 908 is incident on it. The rest dielectric constant is substantially equal to that of the second dielectric material 404, such that the surface state 202 may propagate along the boundary region 204 of the gates 506, 902. When light 516 or 908 is incident on one of the gates 506 or 902, the dielectric constant of the photorefractive material changes to the excited dielectric constant, where the excited dielectric constant is different from that of the second dielectric material such that a surface state 202 may not propagate through the gate 506 or 902. Thus light 516 incident on gate 506 can inhibit light 1002 to be detected by detector 1004, or light 908 incident on gate 902 can inhibit light 514 to be detected by detector 1006, or light 516 and 908 incident on both gates 506 and 902 can inhibit light 514 or 1002 from being detected by detectors 1004 and 1006.

Figure 11:
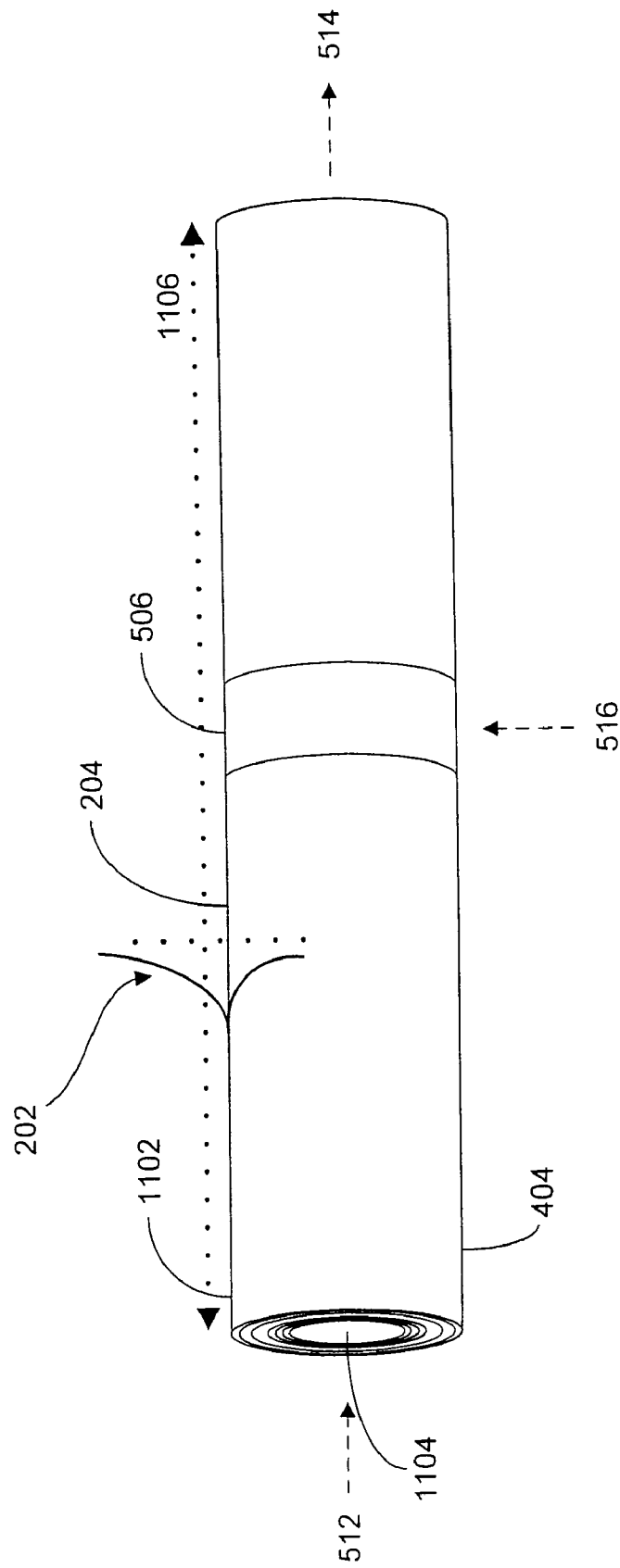
FIG. 11 shows a first photonic crystal structure.

In one embodiment, shown in FIG. 11, the first gate 506 is configured on a fiber 1102. Photonic crystal fibers are described in M. Yan, "INTRODUCTION TO MICROSTRUCTURED OPTICAL FIBERS", Aug. 31, 2005, pages 1-19 available at: http://arxiv.org/PS_cache/physics/pdf/0508/0508139.pdf, a copy of which is attached hereto as Appendix B; and in Fink, et al., U.S. Pat. No. 6,603,911 entitled OMNIDIRECTIONAL MULTILAYER DEVICE FOR ENHANCED OPTICAL WAVEGUIDING, each of which is incorporated herein by reference.

In the embodiment shown in FIG. 11 the fiber 1102 is a radial multilayer waveguide structure having alternating radial layers of a first material 402 and a second material 404, as described in Fink, et al., U.S. Pat. No. 6,603,911. The radial multilayer structure is analogous to that shown in FIG. 4 but with the layers 402, 404 forming radial layers instead of substantially parallel layers. The outermost layer (comprising the second material 404) includes a first gate 506 that includes a photorefractive material configured with a rest dielectric constant when light 516 is not incident on it and an excited dielectric constant when light 516 is incident on it. The rest dielectric constant is substantially equal to that of the second dielectric material 404, such that the surface state 202 (shown in FIGS. 2-4) may propagate along the boundary region 204 of the first gate 506. When light 516 is incident on the first gate 506, the dielectric constant of the photorefractive material changes to the excited dielectric constant, where the excited dielectric constant is different from that of the second dielectric material such that a surface state 202 may not propagate through the first gate 506.

Although the fiber 1102 in FIG. 111 has a substantially circular cross-section 1104 that remains substantially constant along the length 1106 of the fiber, the fiber may have any shape, including but not limited to irregular cross-sections 1104 and/or cross-sections 1104 that vary along the length 1106. Further, although the fiber is a radial multilayer waveguide structure having alternating radial layers, the fiber may be any waveguiding structure having a band gap, including, but not limited to, those described in Yan. The fiber may also include input and output coupling structures 508, 510 (not shown) as described in reference to FIGS. 5 and 6.

Figure 12:
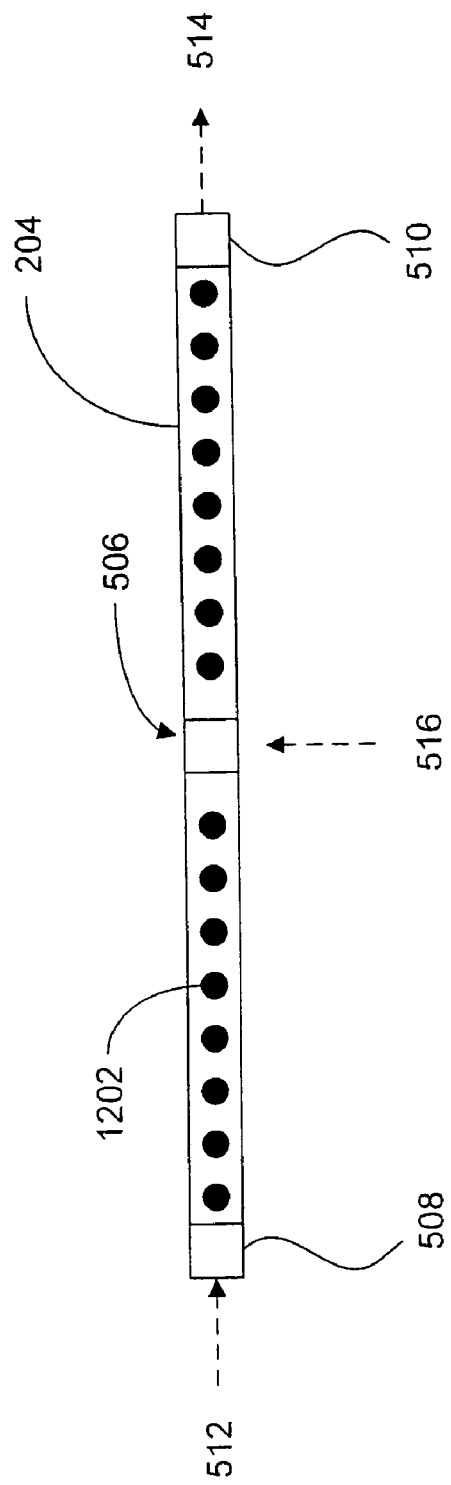
FIG. 12 shows a top view of a first photonic crystal structure.

FIG. 12 shows an embodiment similar to the embodiment shown in FIG. 5, further including an array of nanoparticles 1202 configured to support surface plasmons. Nanoparticles supporting plasmons are described in M. Salerno, J. R. Krenn, B. Lamprecht, G. Schider, H. Ditlbacher, N. Félidj, A. Leitner, and F. R. Aussenegg, "PLASMON POLARITONS IN METAL NANOSTRUCTURES: THE OPTOELECTRONIC ROUTE TO NANOTECHNOLOGY", Opto-Electronics Review, 2002, Volume 10, Number 3, pages 217-222, which is incorporated herein by reference.

The nanoparticles 1202 shown in FIG. 12 are silver nanospheres designed to support surface plasmons at substantially the same frequency as the surface state 202 (shown in FIGS. 2-4) that propagates along the boundary region 204. The operation of the device is as described for FIG. 5, where the nanoparticles 1202 are configured to carry some of the energy that propagates along the boundary region 204.

In some embodiments, the nanoparticles 1202 may be fabricated on the surface of a photonic crystal 206 that is substantially large compared to the size of the nanoparticles to guide a surface state 202 on the photonic crystal 206. In other embodiments the nanoparticles 1202 may be fabricated on a different substrate (not shown) that is between two photonic crystals 206, where the nanoparticles 1202 are configured to carry energy between the two photonic crystals 206. There are many ways of configuring nanoparticles to transport energy and one skilled in the art may find various combinations of photonic crystals 206 and nanoparticles 1202 for transporting energy.

Although the nanoparticles 1202 in FIG. 12 are shown as being substantially spherical, the nanoparticles may have a different shape that is configured to support plasmons. Further, although the nanoparticles 1202 are shown as being substantially the same size, the nanoparticles 1202 may vary in size, by design or by a randomized process of manufacturing the nanoparticles 1202. Further, although the nanoparticles 1202 are described as silver particles, other metal or dielectric nanoparticles support surface plasmons or surface states.

Although FIGS. 1-12 show photonic crystal structures 206 configured to transport surface states over relatively short distances, in some embodiments the photonic crystal structure 206 may be configured to transport a surface state 202 over very long distances of even thousands of kilometers or more.

Applications of surface states and logic systems including surface states are wide ranging. For example, there may be situations, such as in optical fiber systems where all-optical switching is desired, where electromagnetic energy is converted to surface states to do the switching and then converted back to electromagnetic energy.

Energies and polarizations of surface states may depend on the structure of the photonic crystal, including (for a 1 D photonic crystal) the number of layers in the photonic crystal, the materials of the photonic crystal, the layer thicknesses, or other factors, as described in Shuai Feng, Hong-Yi Sang, Zhi-Yuan Li, Bing-Ying Cheng, and Dao-Zhong Zhang, "SENSITIVITY OF SURFACE STATES TO THE STACK SEQUENCE OF ONE-DIMENSIONAL PHOTONIC CRYSTALS", Journal of Optics A, Jul. 12, 2005, Volume 7, pages 374-381, which is incorporated herein by reference.

Further, one skilled in the art may recognize that a photonic crystal may be modified at the surface or in other ways for energy to couple to a surface state on the photonic crystal or for energy to propagate as a surface state along a photonic crystal, as is described in A. I. Rahachou and I. V. Zozoulenko, "SURFACE STATE PHOTONIC BANDGAP CAVITIES", Linkoping University, Department of Science and Technology, Dec. 12, 2005. pages 1-3, available at http://arxiv.org/abs/physics/0507009, which is incorporated herein by reference and a cop), of which is attached hereto as Appendix C.

Further, the photonic crystal structure 206 may be configured with point, line, or areal features on the boundary region 204 that may be configured to trap, direct, focus, catch, or radiate surface states, and may be either topological or dielectric-constant features, and may be isolated or in arrays. For example, resonant high-Q cavities for surface states may be fabricated on photonic crystals for lasing, sensing, filtering, or other applications, as described in Rahachou and Zozoulenko The term 'photonic crystal' is used for directness and clarity and is not limited to materials having crystalline structure but encompasses all materials and/or structures having a photonic band gap. Although the term "surface state" is used to describe a state propagating on the surface of a photonic crystal, one skilled in the art may recognize that other terms may exist for this state, including, but not limited to, "surface mode". Although photonic crystals are often referred to as including dielectric materials, photonic crystals may comprise other materials such as metals.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various embodiments described herein can be implemented, individually and/or collectively, by various types of electromechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electromechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electromechanical systems include but are not limited to a variety of consumer electronics systems, as well as other systems such as motorized transport systems, factory automation systems, security systems, and communication/computing systems. Those skilled in the art will recognize that electromechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The invention claimed is:

1. An apparatus comprising:
a first photonic crystal structure including a boundary region configured to support a surface state, the first photonic crystal structure including a first surface state input coupled to the boundary region, a first surface state output coupled to the boundary region, and a first gate electromagnetically coupled to the boundary region, wherein the first gate is configured to control surface state propagation from the first surface state input to the first surface state output.

2. The apparatus of claim 1 further including a second structure proximate to the first photonic crystal structure.

3. The apparatus of claim 2 wherein the second structure is in intimate contact with the boundary region of the first photonic crystal structure.

4. The apparatus of claim 2 wherein the second structure includes a second photonic crystal.

5. The apparatus of claim 1 wherein the boundary region is configured to support surface states in a first energy range.

6. The apparatus of claim 5 wherein the first energy range includes a first central frequency.

7. The apparatus of claim 5 wherein the first energy range overlaps at least in part with the optical frequency range.

8. The apparatus of claim 5 wherein the first energy range includes a first distribution function.

9. The apparatus of claim 8 wherein the first distribution function is substantially continuous.

10. The apparatus of claim 1 wherein the first photonic crystal structure includes alternating layers of a first material and a second material.

11. The apparatus of claim 10 wherein the first material includes a first dielectric material.

12. The apparatus of claim 11 wherein the second material includes a second dielectric material.

13. The apparatus of claim 1 wherein the first photonic crystal structure includes a substantially 2D photonic crystal.

14. The apparatus of claim 1 wherein the first photonic crystal structure includes a substantially 3D photonic crystal.

15. The apparatus of claim 1 wherein the boundary region is substantially planar.

16. The apparatus of claim 1 wherein the boundary region is non-planar.

17. The apparatus of claim 1 wherein the first gate is configured to receive electromagnetic energy.

18. The apparatus of claim 1 wherein the first gate is configured to receive surface state energy.

19. The apparatus of claim 1 wherein the first gate forms a first region of the first photonic crystal structure.

20. The apparatus of claim 1 further including a second surface state output coupled to the boundary region.

21. The apparatus of claim 1 wherein the first gate includes a photorefractive material.

22. The apparatus of claim 1 wherein the first gate includes a magnetically responsive material.

23. The apparatus of claim 1 wherein the first gate includes an electrically responsive material.

24. The apparatus of claim 1 wherein the first gate includes a thermally responsive material.

25. The apparatus of claim 1 wherein the first gate includes an acoustically responsive material.

26. The apparatus of claim 1 wherein the first gate includes a mobile material.

27. The apparatus of claim 1 wherein the boundary region is patterned to form a surface state guide.

28. An apparatus comprising:
a first photonic crystal structure including a boundary region that includes an array of elements, wherein the boundary region is supportive of a surface state, and wherein the first photonic crystal structure includes a first surface state input coupled to the boundary region, a first surface state output coupled to the boundary region, and a first gate coupled to the boundary region, wherein the first gate is configured to control surface state propagation from the first surface state input to the first surface state output.

29. The apparatus of claim 28 wherein the array includes a dielectric region.

30. The apparatus of claim 28 wherein the array includes a nanoparticle.

31. The apparatus of claim 1 further including a first guide and a second guide, the first guide being configured to include the first surface state input and the first surface state output.

32. The apparatus of claim 31 wherein the first guide and the second guide form an intersection region that includes the first gate.

* * * * *